United States Patent [19]

Beecken

[11] 4,366,314
[45] Dec. 28, 1982

[54] DIMETHINE DYESTUFFS, THEIR PREPARATION AND THEIR USE FOR DYEING SYNTHETIC AND NATURAL MATERIALS

[75] Inventor: Hermann Beecken, Bergisch-Gladbach, Fed. Rep. of Germany

[73] Assignee: Bayer Aktiengesellschaft, Leverkusen, Fed. Rep. of Germany

[21] Appl. No.: 245,287

[22] Filed: Mar. 19, 1981

[30] Foreign Application Priority Data

Apr. 1, 1980 [DE] Fed. Rep. of Germany ....... 3012599

[51] Int. Cl.³ ................. C07D 401/06; C07D 413/06; C07D 417/06
[52] U.S. Cl. ......................... 542/455; 542/430; 542/431; 542/453; 532/458; 542/465; 542/466; 542/467
[58] Field of Search ............... 542/455, 565, 453, 466, 542/458, 467, 430, 431

[56] References Cited

U.S. PATENT DOCUMENTS

| | | | |
|---|---|---|---|
| 2,558,777 | 7/1951 | Papa et al. | 542/455 |
| 3,705,895 | 12/1972 | Levi et al. | 542/455 |
| 4,012,376 | 3/1977 | Wright | 542/466 |
| 4,274,184 | 9/1966 | Thompson et al. | 542/455 |
| 4,288,589 | 9/1981 | Loew | 542/466 |

FOREIGN PATENT DOCUMENTS

2711521 of 0000 Fed. Rep. of Germany.
202754403 of 0000 Fed. Rep. of Germany.

OTHER PUBLICATIONS

Takahashi et al., J. Pharm. Soc. (Japan) 74 (1954), No. 11, pp. 1212–1215.
Takahashi et al., J. Pharm. Soc. (Japan) 76 (1956), No. 2, pp. 195–198.
Takahashi et al., J. Pharm. Soc. (Japan) 78 (1958), No. 5, pp. 467–471.
Hora et al., J. Indian Chem. Soc. 49 (1972), No. 9, pp. 901–905.
Kramer et al., J. Org. Chem. 39 (1974), No. 21, pp. 3132–3136.

*Primary Examiner*—Arthur P. Demers
*Attorney, Agent, or Firm*—Sprung, Horn, Kramer & Woods

[57] ABSTRACT

Styryl dyestuffs of the general formula

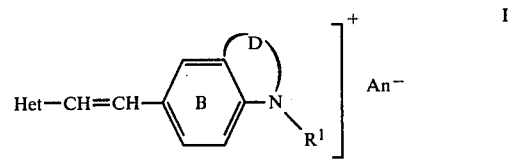

wherein
Het represents a pyridinium radical having the structure

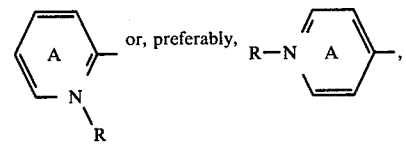

R and R¹ independently of one another designate lower alkyl or alkenyl groups, which can be substituted by non-ionic radicals,
ring A can be substituted by $C_1$- to $C_4$-alkyl,
ring B can be substituted by $C_1$- to $C_4$-alkyl, $C_1$- to $C_4$-alkoxy or halogen,
D represents the remaining members of a 5-membered to 7-membered heterocyclic ring and
An⁻ represents an anion, are used for dyeing natural and synthetic substrates which can be dyed with cationic dyestuffs, in particular for beater-dyeing paper and for writing and printing on paper.

4 Claims, No Drawings

DIMETHINE DYESTUFFS, THEIR PREPARATION AND THEIR USE FOR DYEING SYNTHETIC AND NATURAL MATERIALS

The present invention relates to brilliant styryl dyestuffs of the general formula

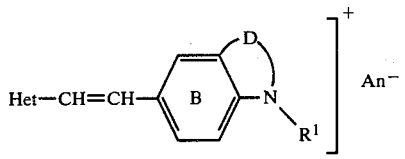

wherein
Het represents a pyridinium radical having the structure

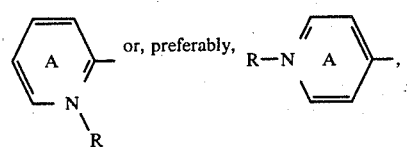

R and $R^1$ independently of one another designate lower alkyl or alkenyl groups, which can be substituted by non-ionic radicals,
ring A can be substituted by $C_1$- to $C_4$-alkyl,
ring B can be substituted by $C_1$- to $C_4$-alkyl, $C_1$- to $C_4$-alkoxy or halogen,
D represents the remaining members of a 5-membered to 7-membered heterocyclic ring and
$An^-$ represents an anion,
and to their preparation and use for dyeing natural and synthetic substrates which can be dyed with cationic dyestuffs, in particular for beater-dyeing paper and for writing and printing on paper.

Preferred dyestuffs of the formula I are those of the general formula

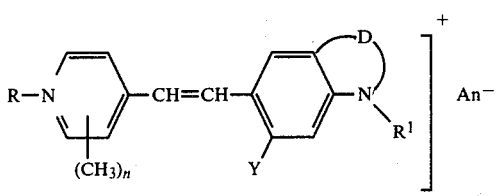

wherein
R, $R^1$, D and $An^-$ have the abovementioned meanings,
n is a number from 0 to 2 and
Y is H, $CH_3$, $OCH_3$, $OC_2H_5$, $CF_3$ or Cl.

In the above text, the expression "lower alkyl radicals" designates straight-chain or branched alkyl radicals with preferably 1 to 4 C atoms, and the expression "lower alkenyl radicals" designates, in particular, $C_3$- or $C_4$-alkenyl radicals. These radicals can be further substituted by non-ionic substituents customary in dyestuff chemistry. Possible substituents of this type within the context of the invention are, in particular, the following: halogen, cyano, hydroxyl, $C_1$- to $C_4$-alkoxy, phenyl, phenyloxy, benzyloxy, $C_1$- to $C_3$-alkylcarbonyl, $C_1$- to $C_4$-alkoxycarbonyl, benzyloxycarbonyl, $C_1$- to $C_3$-alkylcarbonyloxy, benzoyl, benzoyloxy, carbamoyl which is optionally substituted by $C_1$- to $C_4$-alkyl, phenyl or benzyl, $C_1$- to $C_4$-alkylsulphonyl, phenylsulphonyl, benzylsulphonyl, $C_1$- to $C_4$-alkylsulphonylamino, phenylsulphonylamino, benzylsulphonylamino, $C_1$- to $C_3$-alkylcarbonylamino, benzoylamino, carbamoyloxy which is optionally substituted by $C_1$- to $C_4$-alkyl, phenyl or benzyl, $C_1$- to $C_4$-alkylmercapto, phenylmercapto, cyclopentyl or cyclohexyl. The cyclic radicals can in turn be substituted by $C_1$- to $C_4$-alkyl, nitro or the abovementioned radicals.

The following non-ionic substituents may serve to illustrate the above: F, Cl, Br, CN, $COCH_3$, $COC_2H_5$, $COC_6H_5$, $COOCH_3$, $COOC_2H_5$, $COOC_3H_7$, $COOC_4H_9$, $COOCH_2C_6H_5$, $CONH_2$, $CONHCH_3$, $CON(CH_3)_2$, $CONHC_6H_5$, $CONHCH_2C_6H_5$, OH, $OCH_3$, $OC_2H_5$, $OC_3H_7$, $OC_4H_9$, $OC_6H_5$, $OC_6H_4Cl$ (Cl in the o-, m- or p-position), $OC_6H_4CH_3$ ($CH_3$ in the o-, m- or p-position), $OCH_2C_6H_5$, $OCH_2C_6H_4Cl$ (Cl in the o-, m- or p-position), 2-, 3- or 4-cyclopentyl-phenoxy, 2-, 3- or 4-cyclohexyl-phenoxy, 2-, 3- or 4-tert.-butyl-phenoxy, 2-, 3- or 4-phenyl-phenoxy, 2-, 3- or 4-benzyl-phenoxy, $OCOCH_3$, $OCOC_2H_5$, $OCOC_3H_7$, $OCOC_6H_5$, $OCOC_6H_4CH_3$ ($CH_3$ in the o-, m- or p-position), $OCOC_6H_4Cl$ (Cl in the o-, m- or p-position), $OCOC_6H_4OCH_3$ ($OCH_3$ in the o-, m- or p-position), $OCOC_6H_4C_6H_5$ ($C_6H_5$ in the p-position), $OCOCH_2C_6H_5$, $OCOCH_2C_6H_4CH_3$ ($CH_3$ in the o-, m- or p-position), $OCOCH_2C_6H_4Cl$ (Cl in the o-, m- or p-position), $OCONHCH_3$, $OCONHC_2H_5$, $OCONHC_3H_7$, $OCONHC_4H_9$, $OCONHC_6H_5$, $OCON(CH_3)_2$, $OCON(C_2H_5)_2$, $SCH_3$, $SC_2H_5$, $SC_3H_7$, $SC_4H_9$, $SC_6H_5$, $SO_2C_6H_5$, benzothiazol-2-yl-mercapto, $NHCOCH_3$, $NHCOC_2H_5$, $NHCOC_6H_5$, $NHSO_2CH_3$, $NHSO_2C_6H_5$, $NHSO_2CH_2C_6H_5$, $C_6H_5$, $C_6H_4CH_3$ ($CH_3$ in the o-, m- or p-position) and $C_6H_4Cl$ (Cl in the o-, m- or p-position).

It is clear that no limitation is intended by naming the more customary non-ionic substituents, but that these still permit many variations in the context of the invention.

Possible halogen substituents in ring B are fluorine, bromine and, preferably, chlorine.

Possible anions $An^-$ are the inorganic and organic anions customary for cationic dyestuffs (compare, for example, German Offenlegungsschriften 2,128,326, pages 5–7, and 2,520,816, pages 4–6). Colourless anions which impart to the dyestuff in question the solubility properties desired for the intended dyeing operation are preferred.

The anion is in most cases determined by the preparation process and any purification carried out on the cationic compounds. In general, the dyestuffs are in the form of halides, in particular chlorides or bromides, methosulphates, ethosulphates, sulphates, nitrates, chlorozincates, benzene-, toluene- or naphthalene-sulphonates, acetates, glycolates, lactates and the like. These anions can be replaced by others in a known manner. This also includes the possibility of precipitation of the dyestuff cations with anions which render them sparingly soluble, if appropriate also complex anions ("FANAL salts"), or with dyestuff anions.

Ring B forms a fused ring system with the chain D. Chain D preferably contains 2 to 4 carbon atoms in an unbranched arrangement, and the carbon atom linked to ring B can be replaced by a hetero-atom, such as nitrogen, sulphur and, in particular, oxygen, and the hydrogen atom can be replaced by lower alkyl or halogen, preferably by methyl, ethyl or chlorine.

The fused ring system in the context of the invention preferably has the following structure:

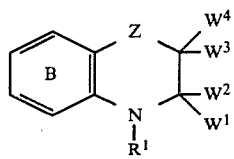

wherein
B and $R^1$ have the meanings given under formula I,
$W^1$, $W^2$, $W^3$ and $W^4$ independently of one another represent hydrogen or $C_1$- to $C_4$-alkyl, and $W^1$ can also represent phenyl,
$W^3$ can also represent chlorine,
$W^1$ and $W^3$ together can form the remaining members of a cyclohexane ring and
$W^3$ and $W^4$ together can form the remaining members of a cyclopentane or cyclohexane ring and
Z represents O, S, N-$W^5$ or

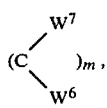

wherein
m can be 0, 1 or 2 and
$W^5$, $W^6$ and $W^7$ independently of one another can be H or $C_1$- to $C_4$-alkyl.

Dyestuffs of the formula I which are to be singled out in particular are those of the formula

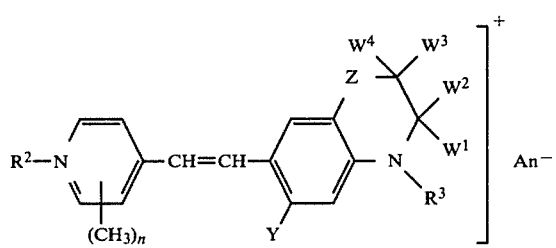

wherein
Y, n, Z, $W^1$, $W^2$, $W^3$, $W^4$ and $An^-$ have the above-mentioned meanings and
$R^2$ and $R^3$ represent $C_1$- to $C_4$-alkyl, which can be substituted by phenyl or $C_1$- to $C_4$-alkoxycarbonyl, $C_3$- or $C_4$-alkenyl, which can be substituted by phenyl, $C_2$- to $C_4$-alkyl, which is substituted by one hydroxyl, $C_1$- to $C_4$-alkoxy, phenoxy, benzyloxy, benzoyloxy, benzamido, phenylsulphamido, mesylamino, $C_1$- to $C_3$-alkylcarbonyloxy, $C_1$- to $C_4$-alkylcarbamoyloxy, phenylcarbamoyloxy, chlorine or cyano radical, or $C_3$- or $C_4$-alkyl, which is substituted by one or two hydroxyl, methoxy, ethoxy, acetoxy or chlorine radicals, it being possible for the phenyl radicals in turn to be substituted by one hydroxyl, $C_1$- to $C_4$-alkoxy, $C_1$- to $C_4$-alkoxycarbonyl, $C_5$- or $C_6$-cycloalkyl, benzyl, 2-phenyl-prop-2-yl, phenoxy, benzyloxy, phenylmercapto, phenylsulphonyl, nitro or cyano radical or by 1 to 3 fluorine, chlorine, bromine or $C_1$- to $C_4$-alkyl radicals.

Because of their particularly good dyeing properties, the dyestuffs, according to the invention, of the formula

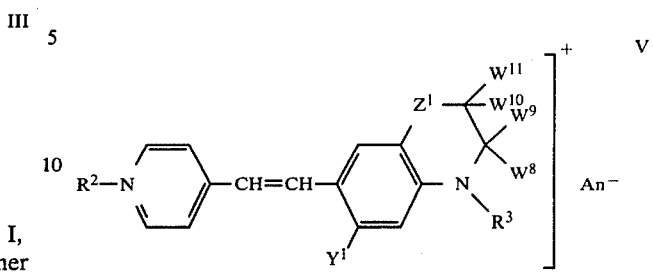

wherein
$R^2$, $R^3$ and $An^-$ have the meanings defined above,
$Y^1$ designates H, $CH_3$, $OCH_3$, $OC_2H_5$ or Cl,
$Z^1$ designates $CH_2$, $CHCH_3$ or a direct bond and
$W^8$, $W^9$, $W^{10}$ and $W^{11}$ independently of one another designate H, $CH_3$ or $C_2H_5$,
are of particular industrial interest.

The new dyestuffs are prepared in a manner known per se, by subjecting quaternary salts of the formula

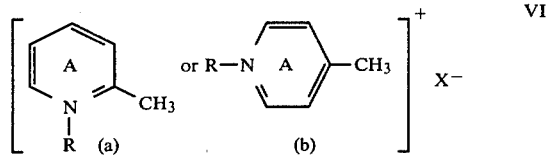

wherein
R and ring A have the meanings given above and
$X^-$ represents an anion, which can be different to the $An^-$ in the end dyestuff,
to a condensation reaction with aldehydes of the formula

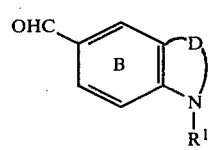

wherein
$R^1$, ring B and chain D have the meanings given above,
or functional derivatives thereof (azomethines, imonium salts and the like).

The condensation reactions are carried out at temperatures between 20° and 160° C., preferably in the range from 50°–120° C., in an organic solvent. Suitable solvents are, for example, alcohols, such as methanol, ethanol, the propanols and butanols and also benzyl alcohol, ethyl acetate, methyl benzoate, formic acid, acetic acid, $C_2$- to $C_4$-glycols and their $C_1$- to $C_4$-alkyl ethers, dimethylformamide, dimethylacetamide, tetramethylurea, acetonitrile, benzonitrile and others.

Basic catalysts, such as, for example triethylamine, pyridine, piperidine, N-ethyl-piperidine, N-methylmorpholine, alkali metal carbonates, alkali metal acetates and acetates of inorganic or organic nitrogen bases, such as, for example, ammonium acetate or piperidine acetate, can be added to accelerate the condensation reaction.

A large number of the quaternary salts of the formula VI are accessible in a known manner from optionally further substituted 2-methyl- and 4-methyl-pyridines by reaction with alkylating agents R-X. In many cases, an intermediate compound is first prepared, such as, for example, N-hydroxyethyl-picolinium chloride, which only gives the desired starting material VI in a 2nd stage, for example by reaction with acyl anhydrides, isocyanates and the like.

Some of the aldehydes of the formula VII are known, or they can be obtained by customary methods, by subjecting the corresponding tertiary aromatic amines III to formylation, the reactions according to Vilsmeier and Haack or according to Duff (J. Chem. Soc. (London) 1952, pages 1159–1164, advantageously in the embodiment according to German Patent Specification No. 1,206,879), being used in particular.

The compounds III are obtained, for example from the following fused starting compounds by N-substitution, (alkylation, hydroxyalkylation, aralkylation and the like), hydrogenation and other known steps: 2-methylene-1,3,3-trimethyl-2,3-dihydroindole, 2-phenyl-, 2-methyl-, 2-ethyl-, 2-methyl-6-chloro-, 2,5-dimethyl-, 2,3,3-trimethyl-, 2,3,3,6-tetramethyl-, 2,3,3-trimethyl-6-chloro-, 2,3,3-trimethyl-6-methoxy- or 2,3,3,7-tetramethyl-2,3-dihydroindole, 1,2,3,4-tetrahydroquinoline, 2-methyl-, 2,7-dimethyl-, 2,2,4-trimethyl-, 2-methyl-7-methoxy-, 2-methyl-7-chloro-, 2-methyl-7-bromo-, 2-methyl-7-phenyl-, 2,2,4-trimethyl-7-methoxy, 2,2,4-trimethyl-7-bromo-, 2-ethyl-, 2,2,4-trimethyl-7-ethoxy-, 2,2,4,7-tetramethyl-, 2,2,4-trimethyl-7-chloro-, 2,2,4-trimethyl-7-trifluoromethyl-, 2-ethyl-7-methyl-, 2-n-butyl-7-methyl or 2-i-propyl-7-methyl-1,2,3,4-tetrahydroquinoline, 3,6-dimethyl-, 2,3-dimethyl-, 2,3,6-trimethyl-, 2,2,3-trimethyl-, 2,2,3,6-tetramethyl-, 2,2,3-trimethyl-6-methoxy-, 2,2,3-trimethyl-6-chloro- or 3-ethyl-6-methyl-2,3-dihydro-1,4-benzoxazine, 3,3-tetramethylene-2-methyl-, 3,3-pentamethylene-2-methyl-, 3,3-tetramethylene-2,6-dimethyl-, 3,3-pentamethylene-2,6-dimethyl-, 2,3-trimethylene-6-methyl-, 2,3-tetramethylene- or 2,3-tetramethylene-6-methyl-2,3-dihydroindole or 2-phenyl-, 2-methyl-, 2-ethyl- or 2,3-dimethyl-indole.

If the N-hydroxyalkyl derivatives of the abovementioned secondary bases are reacted in accordance with the method of Vilsmeier, for example using dimethylformamide and phosphorus oxychloride, the corresponding N-chloroalkyl-aldehydes are obtained therefrom in a known manner.

The dyestuffs according to the invention are suitable for dyeing, printing and bulk-dyeing materials predominantly or completely consisting of polyacrylonitrile or its copolymers with other vinyl monomers, such as vinylidene cyanide, vinylidene chloride, vinyl chloride, vinyl acetate, vinyl alcohol, acrylates or methacrylates or of acid-modified polyesters or polyamides. The brilliant golden yellow to bluish-tinged red dyeings and prints obtained, above all on polyacrylonitrile, are distinguished by good general fastness properties, in particular by very good fastness to wet processing and perspiration, and by an outstanding affinity for the fibre and by a high stability to changes in pH.

The dyestuffs are furthermore suitable for the other known applications of cationic dyestuffs, such as, for example, dyeing and printing cellulose acetate, coir fibres, jute, sisal, silk and tannin-treated cotton, leather and feathers, and for the preparation of ball-point pen pastes, inter alia by precipitation with anionic dyestuffs, and rubber-stamp inks, and for use in flexographic printing.

However, it should be particularly emphasised that the dyestuffs according to the invention are outstandingly suitable for beater-dyeing sized and unsized paper in brilliant golden yellow to bluish-tinged red shades, particularly high affinities being found for lignin-containing paper pulp (paper pulp containing mechanical wood pulp). Moreover, some of the new dyestuffs are also distinguished by a good affinity for lignin-free paper pulp (for example bleached sulphite cellulose), so that such paper pulp can be coloured with considerably reduced staining of the effluent.

The dyestuffs predominantly have good solubilities in water and polar organic solvents, so that they are suitable for the preparation of stable, highly concentrated solutions.

Possible polar organic solvents are acetic acid, glycolic acid, lactic acid, $C_2$- to $C_4$-glycols, glycol monoalkyl and dialkyl ethers, glycol mono- and di-acetates, $C_1$- to $C_4$-alkanols, benzyl alcohol and the customary optimum solvents for the various forms of application, or mixtures thereof.

The following examples serve to illustrate the invention.

EXAMPLE 1

72.4 g of 4,N-dimethyl-pyridinium methosulphate and 75.3 g of N-benzyl-2-methyl-2,3-dihydroindole-5-aldehyde are dissolved in 300 ml of isopropanol of 80° C., 3 ml of piperidine are added and the mixture is heated to 80° C. for 8 hours. During this operation, the solution becomes deep red in colour, and the dyestuff of the formula

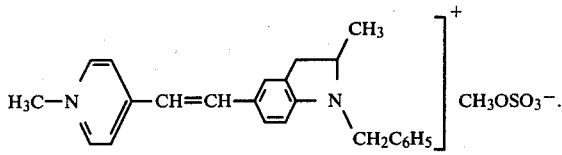

is formed. The product crystallises out and, sometime after the reaction solution has been cooled to 0°–5° C., is filtered off, washed with cold isopropanol and finally dried at 50° C. in vacuo. Including a second fraction obtained from the concentrated mother liquor, the yield is 123.5 g of dyestuff in the form of dark red crystals of melting point 139°–145° C., which can be further purified by recrystallisation from a large quantity of isopropanol. $\lambda_{max}=491$ nm (in 50% strength acetic acid).

The dyestuff obtained dyes polyacrylonitrile in a brilliant red shade with a good level of fastness of the dyeings. It is also suitable for the preparation of rubber-stamp inks and ball-point pen pastes and for flexographic printing.

When used for dyeing paper pulp containing mechanical wood pulp, it is found that the dyestuff has a high affinity for the fibre and the effluent is only slightly stained. The paper is dyed a very clear yellowish-tinged red shade.

The aldehyde required is obtained in crude form as a semi-solid crystal mass in a yield of 94% from N-benzyl-2-methyl-2,3-dihydroindole in accordance with the method of Vilsmeier.

EXAMPLE 2

(a) 57.3 g of 4-methyl-N-β-hydroxyethyl-pyridinium chloride and 83.7 g of N-benzyl-2,3,3-trimethyl-2,3-dihydroindole-5-aldehyde are dissolved in 500 ml of isopropanol, 5 ml of piperidine are added and the mixture is stirred at 80° C. for 20 hours. After cooling, the dyestuff of the formula

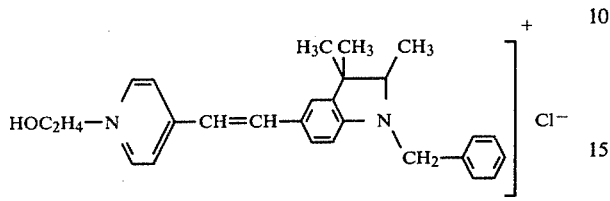

which has crystallised out is filtered off, washed with isopropanol and dried. 114 g of a product with a melting point of 251°-256° C. is obtained. $\lambda_{max}$=490 nm (in 50% strength acetic acid). The product can be dissolved in equal parts of glacial acetic acid/lactic acid to give a 20-30% strength liquid formulation and is outstandingly suitable, inter alia, for beater-dyeing lignin-containing paper pulp in clear red-orange shades.

The 4-methyl-N-β-hydroxyethyl-pyridinium chloride employed for the preparation of the dyestuff is obtained as follows: 99 g of γ-picoline (96% pure) are added to a solution of 81 g of 2-chloro-ethanol in 500 ml of dry toluene at 100° C. and the reaction mixture is heated to the reflux temperature for 15 hours (internal temperature about 112°-114° C.). After cooling the mixture, the quaternary salt which has crystallised out is filtered off, washed with dry toluene and dried at 80° C. in vacuo. Yield: 140 g of melting point 96°-98° C.

The product is very hygroscopic. It can also be prepared without a solvent, at 80°-140° C.

(b) If, instead of N-β-hydroxyethyl-4-methyl-pyridinium chloride, N-β,γ-dihydroxypropyl-4-methyl-pyridinium chloride is employed, the dyestuff of the formula

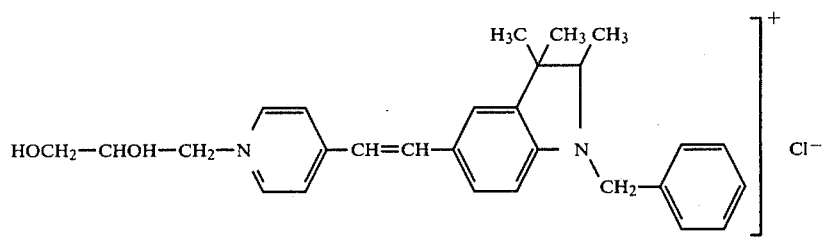

of melting point 263°-267° C. is obtained analogously. $\lambda_{max}$=492–493 nm (in 50% strength acetic acid). This dyestuff is likewise particularly suitable for beater-dyeing paper pulp, in particular paper pulp containing mechanical wood pulp, staining of the effluent being similarly slight, and imparts to the pulp a yellowish-tinged red shade.

EXAMPLE 3

(a) 75.3 g of N-benzyl-1,2,3,4-tetrahydroquinoline-6-aldehyde and 72.4 g of 4,N-dimethyl-pyridinium methosulphate are stirred in 300 ml of isopropanol, after adding 0.5 g of piperidine, at 80° C. for 24 hours. The dyestuff of the formula

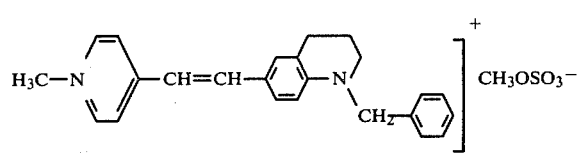

crystallises out and, after the mixtuure has cooled, is isolated in the customary manner. 100.1 g of product of melting point 171°-178° C. are obtained. $\lambda_{max}$=492 nm (in 50% strength acetic acid). The product has a high affinity for paper containing mechanical wood pulp and can be used for beater-dyeing such paper in clear yellowish-tinged red shades.

(b) Starting from the same aldehyde and N-β-hydroxyethyl-4-methyl-pyridinium chloride, the dyestuff of the formula

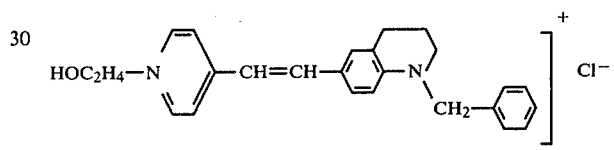

of melting point 242°-248° C. is obtained analogously. $\lambda_{max}$=498 nm (in 50% strength acetic acid). The dyestuff has similarly good dyeing properties for paper pulp (red).

(c) If N,β,γ-dihydroxypropyl-4-methyl-pyridinium chloride is employed, the dyestuff of the formula

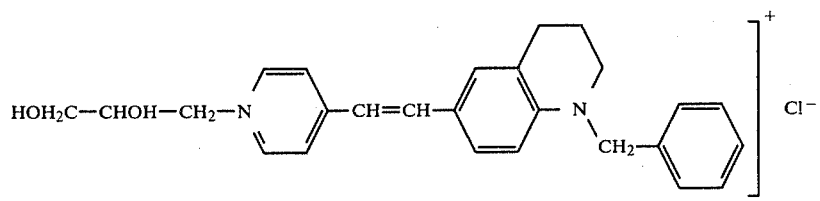

of melting point 235°-241° C. is formed. $\lambda_{max}$=502 nm (in 50% strength acetic acid). This dyestuff dyes, in particular, paper pulp containing mechanical wood pulp in clear red shades and has an excellent affinity for the pulp.

EXAMPLE 4

88.5 g of crystalline dyestuff of the formula

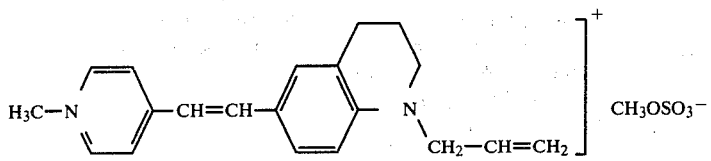

of melting point 168°–170° C. are obtained from 60.3 g of N-allyl-1,2,3,4-tetrahydroquinoline-6-aldehyde and 72.4 g of 4,N-dimethyl-pyridinium methosulphate in 300 g of isopropanol analogously to Example 1. $\mu_{max}=495$ nm (in 50% strength acetic acid). The product dyes paper pulp containing mechanical wood pulp in clear orange-red shades and has a high affinity for such pulp.

EXAMPLE 5

Analogously to Example 1, 13.8 g of N-ethyl-2,2,4-trimethyl-1,2,3,4-tetrahydroquinoline-6-aldehyde and 11.5 g of N-β-hydroxyethyl-4-methyl-pyridinium chloride in 60 ml of isopropanol, with the addition of 0.3 ml of piperidine, give the dyestuff of the formula:

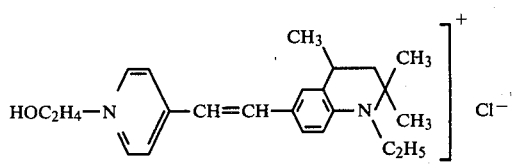

The product has a melting point of 240°–243° C. $\lambda_{max}=510$ nm (in 50% strength acetic acid). It can be dissolved (for example in H₂O, dilute acetic acid, H₂O/glycol mixtures and the like) without difficulty, to give a highly concentrated liquid formulation which is outstandingly suitable for dyeing paper pulp, in particular pulp containing mechanical wood pulp, and dyes this pulp, with outstanding affinity, in very clear bluish-tinged red shades.

EXAMPLE 6

If 17.6 g of N-benzyl-2,2,4-trimethyl-1,2,3,4-tetrahydroquinoline-6-aldehyde are employed as the aldehyde and the procedure followed is otherwise as in Example 5, the dyestuff of the formula

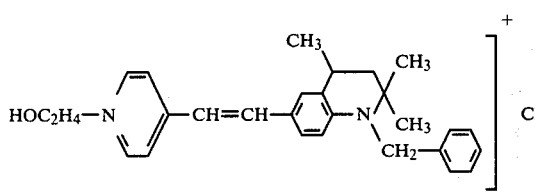

is obtained in crystalline form with a melting point of 248°–251° C. $\lambda_{max}=496$ nm (in 50% strength acetic acid). The product is particularly suitable for beater-dyeing paper, extremely brilliant red-orange shades being achieved.

EXAMPLE 7

If, deviating from Example 5, 17.3 g of N-β-acetoxyethyl-2,2,4-trimethyl-1,2,3,4-tetrahydroquinoline-6-aldehyde are employed as the aldehyde, the dyestuff of the formula

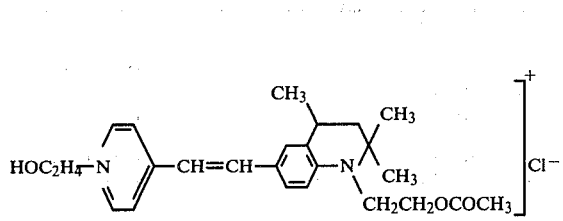

of melting point 215°–219° C. is isolated. $\lambda_{max}=488$ nm (in 50% strength acetic acid). The product is outstandingly suitable for dyeing lignin-containing paper pulp in very clear reddish-tinged orange shades.

EXAMPLE 8

If 15.9 g of N-β-chloroethyl-2,2,4-trimethyl-1,2,3,4-tetrahydroquinoline-6-aldehyde are used instead of the aldehyde employed in Example 5, the dyestuff of the formula

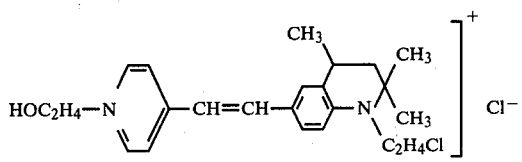

with a melting point of 248°–252° C. is obtained. $\lambda_{max}=484$ nm (in 50% strength acetic acid). The dyestuff imparts red-orange shades of outstanding brilliance to, in particular, beater-dyed lignin-containing paper.

The aldehyde used is prepared as follows.

61.4 g of phosphorus oxychloride are slowly added dropwise to 87.5 g of N-β-hydroxyethyl-2,2,4-trimethyl-1,2,3,4-tetrahydroquinoline at 60° C. to a maximum of 80° C., whilst stirring. Stirring is continued for about 3 hours at 80° C., until the reaction is complete, and 160 ml of dimethylformamide are then added and the mixture is kept at 70°–80° C. for 10 hours, until the formylation has ended (thin layer chromatography on silica gel layers using the mobile phase toluene/chloroform 1:1 v/v). The reaction melt is discharged onto 400 g of ice, the pH is adjusted to 9 with concentrated aqueous ammonia and the aldehyde which has crystallised out is isolated in the customary manner. Yield: 102.8 g of melting point 70°–75° C. (crude).

The starting compounds in the other examples were obtained in a corresponding manner.

Other dyestuffs, according to the invention, of the formula

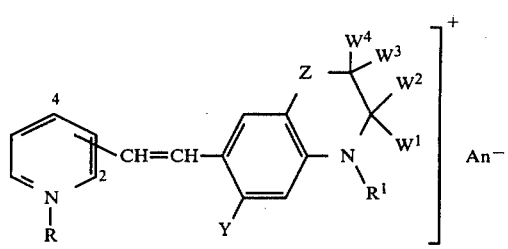

are obtained analogously to the above examples, using appropriate starting materials. These dyestuffs have comparable coloristic properties when used for dyeing the abovementioned materials, in particular polyacrylonitrile and acid-modified polyesters and polyamides and, preferably, when used for beater-dyeing sized and unsized paper pulp, the effluents being only slightly stained. A selection of these dyestuffs is summarised in the following table, as well as the colour shade of the beater-dyed paper.

| Example No. | R | Position to which the methine chain is linked | $R^1$ | Y | $W^1$ | $W^2$ | $W^3$ | $W^4$ | Z | Colour shade of beater-dyed paper |
|---|---|---|---|---|---|---|---|---|---|---|
| 9 | $HOC_2H_4$ | 4- | $CH_2C_6H_5$ | H | H | $CH_3$ | H | H | —* | yellowish-tinged red |
| 10 | $CH_3$ | 4- | $C_4H_9$ | " | " | " | " | " | " | red |
| 11 | $HOC_2H_4$ | 4- | " | " | " | " | " | " | " | red |
| 12 | $CH_3$ | 4- | $CH_2C_6H_5$ | " | " | $CH_3$ | $CH_3$ | $CH_3$ | " | yellowish-tinged red |
| 13 | $HOC_2H_4$ | 4- | $CH_2CH=CH_2$ | " | " | H | H | H | $CH_2$ | red |
| 14 | $C_6H_5CH_2$ | 4- | $CH_3$ | " | $CH_3$ | $CH_3$ | " | " | $CHCH_3$ | bluish-tinged red |
| 15 | $C_2H_5$ | 4- | " | " | " | " | " | " | " | red |
| 16 | $CH_3$ | 4- | " | " | " | " | " | " | " | red |
| 17 | $HOC_2H_4$ | 4- | " | " | " | " | " | " | " | red |
| 18 | " | 2- | " | " | " | " | " | " | " | orange |
| 19 | $CH_2CH_2C_6H_5$ | 4- | " | " | " | " | " | " | " | red |
| 20 | $CH_2CH_2OC_6H_5$ | 4- | " | " | " | " | " | " | " | red |
| 21 | $CH_2CH_2OCOC_6H_5$ | 4- | $CH_3$ | H | $CH_3$ | $CH_3$ | H | H | $CHCH_3$ | red |
| 22 | $CH_3$ | 4- | $C_2H_5$ | H | " | " | " | " | " | bluish-tinged red |
| 23 | $C_2H_5$ | 4- | " | " | " | " | " | " | " | bluish-tinged red |
| 24 | $C_6H_5CH_2$ | 4- | " | " | " | " | " | " | " | reddish-tinged violet |
| 25 | $HOC_2H_4$ | 4- | " | " | " | " | " | " | " | bluish-tinged red |
| 26 | " | 4- | " | $CH_3$ | " | " | " | " | " | bluish-tinged red |
| 27 | " | 2- | " | H | " | " | " | " | " | reddish-tinged orange |
| 28 | $CH_3$ | 4- | $C_2H_4Cl$ | " | " | " | " | " | " | reddish-tinged orange |
| 29 | $C_2H_5$ | 4- | " | " | " | " | " | " | " | red-orange |
| 30 | $HOC_2H_4$ | 4- | " | $CH_3$ | " | " | " | " | " | reddish-tinged orange |
| 31 | " | 4- | " | $OCH_3$ | " | " | " | " | " | red-orange |
| 32 | $CH_3COOC_2H_4$ | 4- | " | H | " | " | " | " | " | yellowish-tinged red |
| 33 | $HOCH_2CHOHCH_2$ | 4- | " | " | " | " | " | " | " | yellowish-tinged red |
| 34 | $HOC_2H_4$ | 2- | " | " | " | " | " | " | " | yellow-orange |
| 35 | $CH_3$ | 4- | $C_2H_4OCOCH_3$ | " | " | " | " | " | " | reddish-tinged orange |
| 36 | $C_2H_5$ | 4- | $C_2H_4OCOCH_3$ | H | $CH_3$ | $CH_3$ | H | H | $CHCH_3$ | orange |
| 37 | $HOC_2H_4$ | 4- | " | $CH_3$ | " | " | " | " | " | orange |
| 38 | " | 2- | " | H | " | " | " | " | " | orange-yellow |
| 39 | " | 4- | $C_2H_4OH$ | " | " | " | " | " | " | yellowish-tinged red |
| 40 | " | 4- | $C_3H_7$ | " | " | " | " | " | " | bluish-tinged red |
| 41 | " | 4- | " | $CH_3$ | " | " | " | " | " | bluish-tinged red |
| 42 | " | 4- | " | $OC_2H_5$ | " | " | " | " | " | red |
| 43 | " | 4- | " | Cl | " | " | " | " | " | red |
| 44 | $CH_3COOC_2H_4$ | 4- | " | H | " | " | " | " | " | bluish-tinged red |
| 45 | $HOC_2H_4$ | 4- | $C_4H_9$ | " | " | " | " | " | " | bluish-tinged red |
| 46 | " | 4- | " | $CH_3$ | " | " | " | " | " | bluish-tinged red |
| 47 | $CH_3$ | 4- | " | H | " | " | " | " | " | red |
| 48 | $HOCH_2CHOHCH_2$ | 4- | " | " | " | " | " | " | " | bluish-tinged red |
| 49 | $CH_3$ | 4- | $CH_2C_6H_5$ | " | " | " | " | " | " | orange-red |
| 50 | $C_2H_5$ | 4- | " | " | " | " | " | " | " | orange-red |
| 51 | $HOCH_2CHOHCH_2$ | 4- | " | " | " | " | " | " | " | orange-red |
| 52 | $CH_3COOCH_2CHOHCH_2$ | 4- | $CH_2C_6H_5$ | H | $CH_3$ | $CH_3$ | H | H | $CHCH_3$ | red |
| 53 | $CH_3COOCH_2$<br>    \|<br>$CH_3COOCH$<br>    \|<br>    $CH_2$ | 4- | " | " | " | " | " | " | " | bluish-tinged red |
| 54 | $CH_3COOC_2H_4$ | 4- | " | " | " | " | " | " | " | red-orange |
| 55 | $HOC_2H_4$ | 4- | $C_2H_4OCH_2C_6H_5$ | " | " | " | " | " | " | reddish-tinged |

-continued

| Example No. | R | Position to which the methine chain is linked | $R^1$ | Y | $W^1$ | $W^2$ | $W^3$ | $W^4$ | Z | Colour shade of beater-dyed paper |
|---|---|---|---|---|---|---|---|---|---|---|
| 56 | " | 4- | $C_2H_4OCONHCH_3$ | " | " | " | " | " | " | orange reddish-tinged |
| 57 | " | 4- | $C_2H_4OCONHC_6H_5$ | " | " | " | " | " | " | orange reddish-tinged |
| 58 | " | 4- | $C_2H_4OC_6H_4CH_3(p)$ | " | " | " | " | " | " | orange reddish-tinged |
| 59 | " | 4- | $C_2H_4Cl$ | $CH_3$ | H | " | " | " | O | orange |
| 60 | $CH_3$ | 4- | $C_2H_4CO_2CH_3$ | H | $CH_3$ | " | " | " | $CHCH_3$ | orange |
| 61 | $C_2H_5$ | 4- | $C_2H_4CN$ | " | " | " | " | " | " | orange |

*direct bond

EXAMPLE 62

An amount of polyacrylonitrile fibre corresponding to a liquor ratio of 1:40 is introduced, at 40° C., into an aqueous dyebath which contains, per 1,000 ml, 0.75 g of 30% strength acetic acid, 0.38 g of sodium acetate and 0.15 g of the dyestuff described in Example 3, the bath is heated to the boiling point in the course of 20-30 minutes and dyeing is carried out at the boiling point for 30-60 minutes. The dyed material is then rinsed and dried and has a brilliant yellowish-tinged red dyeing which is distinguished generally by good fastness properties, in particular by very good fastness to washing and decatising.

If wet-spun polyacrylonitrile fibres are dyed with the same dyestuff under the conditions of the so-called NEOCHROM process, dyeings with a comparably high level of fastness are likewise obtained.

EXAMPLE 63

The desired amount of a stock solution prepared from 15 g of the dyestuff according to Example 4, 15 g of polyacrylonitrile and 70 g of dimethylformamide is added to a customary spinning solution of polyacrylonitrile and the dyed solution is spun in the known manner. Polyacrylonitrile filaments with a clear orange-red dyeing which has good fastness properties, in particular very good fastness to washing and decatising, result.

EXAMPLE 64

A polyacrylonitrile fabric is printed with a printing paste of the following composition: 30 g of the dyestuff described in Example 6, 50 g of diethylene thioglycol, 30 g of cyclohexanol, 30 g of 30% strength acetic acid, 500 g of crystal gum, 30 g of aqueous zinc nitrate solution (d=1.5 g cm$^{-3}$) and 330 g of water.

The brilliant red-orange print obtained is dried, steamed for 30 minutes and then rinsed. It is distinguished by good fastness properties.

EXAMPLE 65

Acid-modified polyglycol terephthalate fibres (for example those described in Belgian Pat. No. 594,179 and in U.S. Pat. No. 2,893,816) are introduced, at 20° C. and in a liquor ratio of 1:40, into a dyebath which contains, per 1,000 ml, 3-10 g of sodium sulphate, 0.1-2 g of oleyl polyglycol ether (containing 50 mols of ethylene oxide), 0-15 g of dimethylbenzyl-dodecylammonium chloride and 0.3 g of the dyestuff according to Example 29, and has been adjusted to a pH value of 4.5-5.5 with acetic acid or sodium acetate. The bath is heated to 98° C. in the course of 30 minutes and is kept at this temperature for 60 minutes. After subsequent rinsing and drying of the fibres, these have a brilliant red-orange dyeing with good fastness properties.

EXAMPLE 66

0.15 g of the dyestuff according to Example 23 is made up to 500 ml with water, after adding 0.5 g of oleyl polyglycol ether (containing 50 mols of ethylene oxide), in a dyeing beaker which has a capacity of 500 ml and is in a heated water bath, and the pH value of the dye liquor is adjusted to 4.5-5. 10 g of acid-modified polyamide piece goods are agitated continuously in this liquor, whilst the bath temperature is increased to 100° C. in the course of 15 minutes. After dyeing at the boiling point for 15-20 minutes, the dyed material is rinsed and dried, for example by ironing or at 60°-70° C. in a drying cabinet. A clear, bluish-tinged red dyeing with good fastness properties is obtained.

EXAMPLE 67

Dry substance consisting of 60% of mechanical wood pulp and 40% of unbleached sulphite pulp is suspended in an amount of water, and beaten to a SR freeness of 40°, in a hollander, such that the solids content is somewhat above 2.5%, and the high-density substance is then adjusted to an exact solids content of 2.5% with water.

5 g of a 0.25% strength aqueous solution of the dyestuff according to Example 45 are added to 200 g of this high-density substance, the mixture is stirred for about 5 minutes, 2% of resin size and 4% of alum, relative to the dry substance, are added and the mixture is again stirred homogeneously for some minutes. The pulp is diluted to 700 ml with about 500 g of water and sheets of paper are produced therefrom in a known manner by filtration over a sheet-forming machine. The paper has a brilliant bluish-tinged red dyeing. The amount of dyestuff not bonded to the paper is determined photometrically (at $\lambda_{max}=507$ nm) as about 2%, in the effluent of the sheet-forming machine. When unsized paper pulp is dyed by an otherwise identical procedure, about 3% of non-fixed dyestuff is found.

Virtually all the dyestuffs according to the invention produce a similarly low staining of the effluent under the above operating conditions.

EXAMPLE 68

5 g of a 0.5% strength aqueous solution of the dyestuff of Example 24 are added to 200 g of a 2.5% strength high-density substance (SR freeness=35°) prepared analogously to Example 67, but exclusively using bleached sulphite pulp, and the pulp is processed to paper, with the addition of resin size and alum. Sheets of paper which are dyed a strong, reddish-tinged violet shade are obtained. According to determination by photometry, the effluent contains only about 15% of the dyestuff employed.

I claim:

1. A styryl dyestuff of the formula

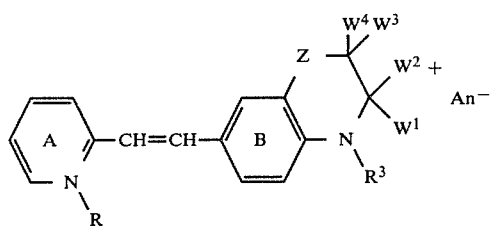

in which

R is a lower alkyl or alkenyl group which can be substituted by a non-ionic radical, $R^3$ is a $C_1$- to $C_4$-alkyl, which can be substituted by phenyl or $C_1$- to $C_4$-alkoxycarbonyl, $C_3$- or $C_4$-alkenyl, which can be substituted by phenyl, $C_2$- to $C_4$-alkyl, which is substituted by one hydroxyl, $C_1$- to $C_4$-alkoxy, phenoxy, benzyloxy, benzoyloxy, benzamido, phenylsulphamido, mesylamino, $C_1$- to $C_3$-alkylcarbonyloxy, $C_1$- to $C_4$-alkylcarbamoyloxy, phenylcarbamoyloxy, chlorine or cyano radical, or $C_3$- or $C_4$-alkyl, which is substituted by one or two hydroxyl, methoxy, ethoxy, acetoxy or chlorine radicals, it being possible for the phenyl radicals in turn to be substituted by one hydroxyl, $C_1$- to $C_4$-alkoxy, $C_1$- to $C_4$-alkoxycarbonyl, $C_5$- or $C_6$-cycloalkyl, benzyl, 2-phenylprop-2-yl, phenoxy, benzyloxy, phenylmercapto, phenylsulphonyl, nitro or cyano radical or by 1 to 3 fluorine, chlorine, bromine or $C_1$- to $C_4$-alkyl radicals, $W^1$, $W^2$, $W^3$ and $W^4$ each independently is hydrogen or $C_1$- to $C_4$-alkyl, and $W^1$ can also represent phenyl, $W^3$ can also represent chlorine, $W^1$ and $W^3$ together can form the remaining members of a cyclohexane ring, or $W^3$ and $W^4$ together can form the remaining members of a cyclopentane or cyclohexane ring, Z is O, S, N-$W^5$ or

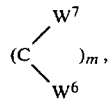

m is 0, 1 or 2, $W^5$, $W^6$ and $W^7$ each independently is H or $C_1$- to $C_4$-alkyl, ring B can be substituted by $C_1$- to $C_4$-alkyl, and $An^-$ is an anion.

2. A dyestuff according to claim 1 of the formula

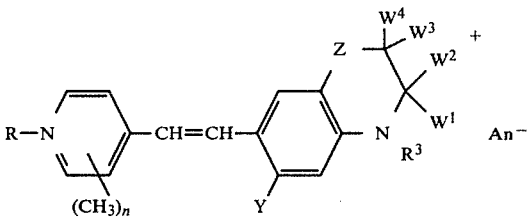

in which n is 0, 1 or 2, and

Y is H, $CH_3$, $OCH_3$, $OC_2H_5$, $CF_3$ or Cl.

3. A dyestuff according to claim 2, in which

R is $C_1$- to $C_4$-alkyl, which can be substituted by phenyl or $C_1$- to $C_4$-alkoxycarbonyl, $C_3$- or $C_4$-alkenyl, which can be substituted by phenyl, $C_2$- to $C_4$-alkyl, which is substituted by one hydroxyl, $C_1$- to $C_4$-alkoxy, phenoxy, benzyloxy, benzoyloxy, benzamido, phenylsulphamido, mesylamino, $C_1$- to $C_3$-alkylcarbonyloxy, $C_1$- to $C_4$-alkylcarbamoyloxy, phenylcarbamoyloxy, chlorine or cyano radical, or $C_3$- or $C_4$-alkyl, which is substituted by one or two hydroxyl, methoxy, ethoxy, acetoxy or chlorine radicals, it being possible for the phenyl radicals in turn to be substituted by one hydroxyl, $C_1$- to $C_4$-alkoxy, $C_1$- to $C_4$-alkoxycarbonyl, $C_5$- or $C_6$-cycloalkyl, benzyl, 2-phenyl-prop-2-yl, phenoxy, benzyloxy, phenylmercapto, phenylsulphonyl, nitro or cyano radical or by 1 to 3 fluorine, chlorine, bromine or $C_1$- to $C_4$-alkyl radicals.

4. A dyestuff according to claim 3, in which n is 0,

Y is H, $CH_3$, $OCH_3$, $OC_2H_5$ or Cl,

Z is $CH_2$, $CHCH_3$ or a direct bond, and $W^1$, $W^2$, $W^3$ and $W^4$ each independently is H, $CH_3$ or $C_2H_5$.

* * * * *